Figure 1:
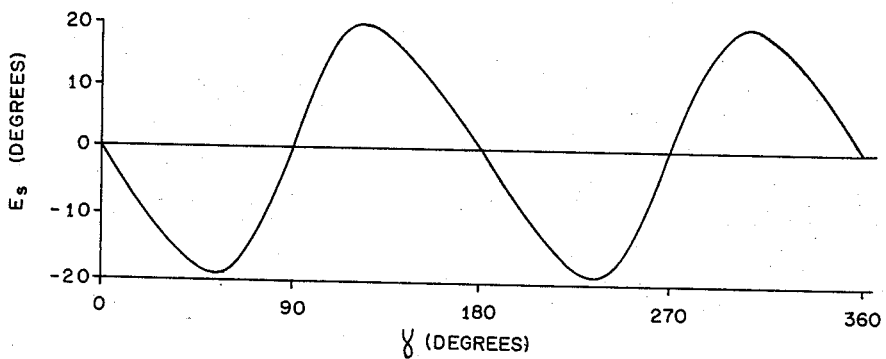

INVENTORS
JOSEPH M. BRANOM
WILLIAM W. BURMEISTER
JAMES R. DOHOGNE
BY
ATTORNEY

United States Patent Office
3,196,332
Patented July 20, 1965

3,196,332
GYROSCOPIC DATA TRANSMISSION SYSTEM AND COMPENSATING MEANS THEREFOR
Joseph M. Branom, William W. Burmeister, and James R. Dohogne, Phoenix, Ariz., assignors to Sperry Rand Corporation, Great Neck, N.Y., a corporation of Delaware
Filed May 28, 1962, Ser. No. 198,300
10 Claims. (Cl. 318—30)

This invention relates to gyroscopic data transmission systems and to compensating means associated therewith for compensating the output signal for errors due to the gimbal configuration and attitude of the gyroscope. This invention is particularly applicable to aircraft gyromagnetic compass systems.

It is common in aircraft compass systems of the type utilizing a directional gyroscope for the indicated heading of the aircraft to be in error when the attitude of the aircraft is other than level. This is caused by the gimbal configuration of the directional gyroscope and it is known as gimbal error. The gimbal error increases as the aircraft attitude varies from level. For example, as an aircraft increases its roll attitude, the gimbal error increases to such an extent that for a roll angle of 60° and zero pitch angle the gimbal error may be approximately 20°. When the aircraft is other than level about one axis, the gimbal error appears as a two or double-cycle error in the associated data transmission system. The characteristics of two cycle error are explained in U.S. Patent 2,700,745, entitled Data Transmission System and Corrector Therefor, invented by Depp et al. and issued January 25, 1955.

Previous attempts to correct for gimbal error in gyroscopic data transmission systems have usually involved roll or pitch stabilization of the directional gyro. These attempts are extremely complex in their mechanization and furthermore they are not universally adaptable to existing gyroscopic data transmission systems.

It is a primary object of the present invention to provide a gyroscopic data transmission system having gimbal error correction means which simply and accurately compensates for gimbal error.

It is a further object of the present invention to provide a gimbal error compensating means which can be readily adapted to existing gyroscopic data transmission systems.

The above objects are accomplished by inserting a variable impedance means in one leg of a synchro transmitter that is mounted on a first gyroscope whose gimbal error signal is to be corrected. An attitude signal representative of the attitude of the first gyroscope is provided, for example, from a second gyroscope. The attitude signal is connected to control the variable impedance means to provide a compensating signal in the data transmission system associated with the transmitter which effectively compensates for the gimbal error.

Figure 2:
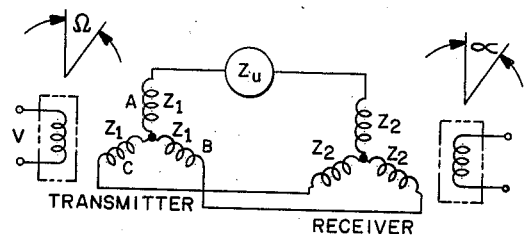
Figure 3:
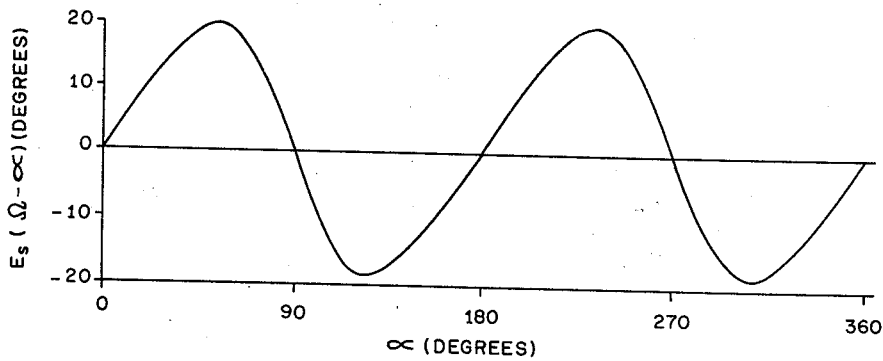
Figure 4:
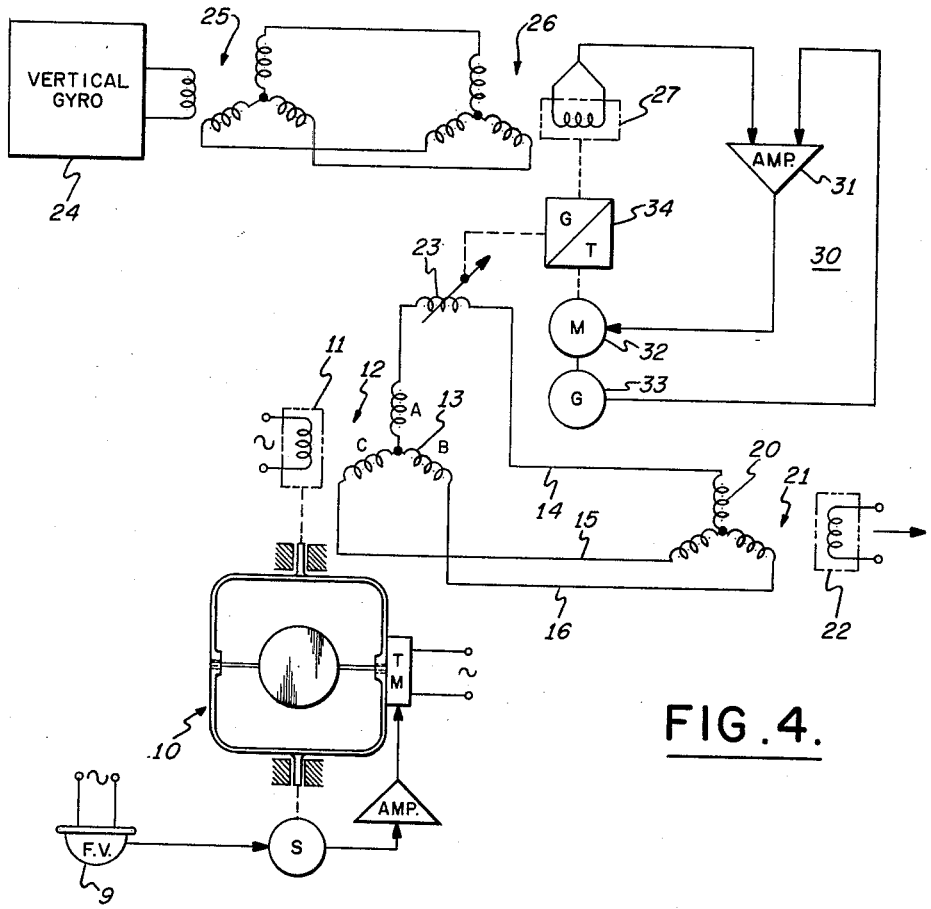
Figure 5:
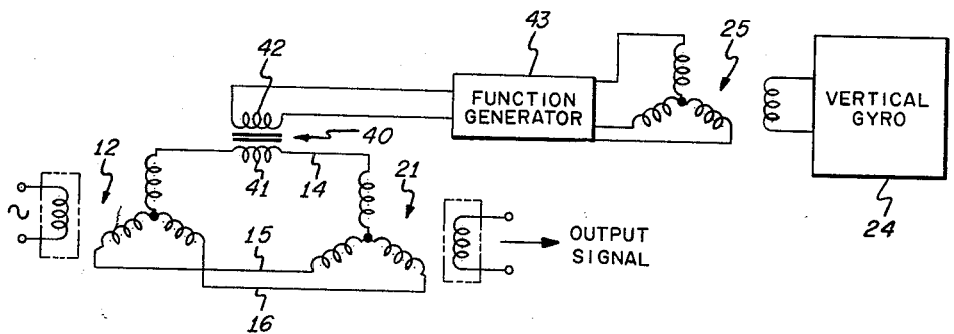

Referring to the drawings:

FIG. 1 is a graph of the gimbal heading error $E_g$ versus actual aircraft heading for a bank angle of 60°;
FIG. 2 is a schematic wiring diagram of a synchro data transmission system having an unbalanced impedance in one portion thereof;
FIG. 3 is a graph of the unbalancing impedance error $E_s$ versus transmitted heading $\Omega$;
FIG. 4 is a schematic diagram showing one form of the present invention; and
FIG. 5 is a schematic diagram showing an alternative form of the present invention.

The present invention will be described for purposes of example with respect to correcting the gimbal error in an aircraft gyroscopic compass system of the type generally shown in U.S. Patent No. 2,357,319, entitled Flux Valve Magnetic Compass issued September 5, 1944 to Esval et al. However, it will be appreciated that this method of compensation is equally applicable to correct the output of any gyro gimbal or Hooke's joint configuration related by the formula, the tangent of the output angle equals a cosine function times the tangent of the true angle, such as the roll output of a vertical gyro on an inclined panel.

The heading of an aircraft is defined as the angular direction of the longitudinal axis of the aircraft with respect to some fixed direction, usually north. Due to gimbal error when the aircraft is other than level, the synchro transmitter mounted on a directional gyro transmits a heading signal which differs from the actual heading in accordance with the equation:

$$\tan G_0 = \tan \gamma \cos \phi \sec \theta - \tan \theta \sin \phi \quad (1)$$

where:
$G_0$ = heading transmitted by gyro
$\gamma$ = actual aircraft heading
$\phi$ = aircraft roll angle
$\theta$ = aircraft pitch angle ($G_0$ and $\gamma$ are relative to the gyro spin axis).

If the aircraft pitch angle is assumed to be zero, the transmitted heading becomes:

$$\tan G_0 = \tan \gamma \cos \phi \quad (2)$$

Defining the gimbal heading error as:

$$E_g = G_0 - \gamma \quad (3)$$

the equation of the gimbal error is:

$$\tan E_g = \tan \gamma \frac{(\cos \phi - 1)}{1 + \tan^2 \gamma \cos \phi} \quad (4)$$

Plotting this equation on coordinates of $E_g$ versus $\gamma$ shows the gimbal error to be a two cycle error for any given value of bank angle $\phi$. A typical plot is shown in FIG. 1 for a bank angle of 60° and zero pitch angle.

Referring now to FIG. 2, if the impedance of one leg of a synchro transmitter is unbalanced, the angle of the resultant flux at the receiver is related to that at the transmitter by the equation:

$$\tan \Omega = \tan \alpha \frac{3Z_t}{3Z_t + 2Z_u} \quad (5)$$

where:
$\alpha$ = received angle,
$\Omega$ = transmitted angle,
$Z_t = Z_1 + Z_2$ = the sum of the impedance of one leg of the transmitting synchro and the impedance of one leg of the receiving synchro, and
$Z_u$ = the unbalancing impedance introduced between one pair of corresponding legs of the transmitting and receiving synchros.

The above equation reduces to:

$$\tan (E_s) = \frac{\tan \alpha (1-p)}{1 + \tan^2 \alpha} \quad (6)$$

where: $E_s$ = synchro error = $\Omega - \alpha$ and $$p = \frac{3Z_t}{3Z_t + 2Z_u}$$

A plot of this error versus received heading ($\alpha$) is shown in FIG. 3.

If the transmitting synchro mounted on a directional gyroscope is aligned such that a null exists across legs B and C when the spin axis is aligned with the longitudinal axis of the aircraft, $\Omega = G_0$ and Equation 5 becomes:

$$\tan G_0 = p \tan \alpha \quad (7)$$

Combining with Equation 2, $$p \tan \alpha = \tan \gamma \cos \phi \quad (8)$$

In order to correct the gimbal error,
$$\tan \alpha = \tan \gamma$$
and
$$\tan \alpha = \tan \gamma, \text{ and } p = \cos \phi = \frac{3Z_t}{3Z_t + 2Z_u} \quad (9)$$
from which
$$Z_u = 3/2 Z_t (\sec \phi - 1) \quad (10)$$

Equation 10 defines the value of impedance necessary for a given roll angle in order to compensate for the gimbal error. The spin axis, synchro null and aircraft longitudinal axis alignment are necessary for proper operation of the system.

The system described above may be extended to compensation for gimbal error due to aircraft pitch angle ($\theta$) by nulling the B and C synchro legs when the gyro spin axis is aligned with the lateral axis of the aircraft. The equation then becomes:

$$\tan G_0 = \tan \gamma \cos \theta \text{ (gimbal error)} \quad (11)$$

$$\tan G_0 = p \tan \alpha \text{ (synchro)} \quad (12)$$

which combine to give:
$$p \tan \alpha = \tan \gamma \cos \theta \quad (13)$$
from which
$$p = \cos \theta \quad (14)$$
and
$$Z_u = 3/2 Z_t (\sec \theta - 1) \quad (15)$$

In accordance with one embodiment of the present invention to correct for gimbal error due to aircraft roll angle, as shown in FIG. 4, a servo loop is responsive to the roll output of a vertical gyro to vary an impedance which is located in series in one leg of the transmitting synchro mounted on the directional gyro. A directional gyro 10 has its spin axis slaved in a conventional manner by means of a flux valve 9 which senses the earth's magnetic field in a manner fully disclosed in said U.S. Patent 2,357,319. The rotor 11 of a synchro transmitter 12 is mounted on the vertical trunnion of the directional gyro 10 and energized by a suitable alternating power source. The Y-connected legs of the stator 13 of the transmitter 12 is connected in multi-circuit fashion by leads 14, 15 and 16 to the respective Y-connected legs of the stator 20 of a synchro receiver 21. In the absence of the present invention, the output signal from the rotor 22 of the synchro receiver 21 would be representative of the output signal from the synchro transmitter 12 and would therefore include a gimbal error, as explained above, when the aircraft is in a banked attitude. In accordance with the above teaching, a variable impedance 23 in the form of an inductor is placed in series in the lead 14 to provide a compensating signal which cancels the gimbal error signal in a manner to be explained.

A vertical gyro 24 is also mounted in the aircraft in which the directional gyro 10 is mounted. The vertical gyro 24 provides a signal from its roll synchro transmitter pick-off 25 representative of the roll attitude of the aircraft and thus the roll attitude of the directional gyro 10. The roll signal from the transmitter 25 is transmitted to a roll synchro receiver 26 which has its rotor 27 positioned by means of a servo loop 30 consisting of a servo amplifier 31, a servomotor 32, a rate feedback generator 33, and a gear train 34. The servo loop 30 drives the rotor 27 of the roll receiver 26 in a direction and through an angle to null the roll attitude signal. The servo loop 30 simultaneously varies the inductance of the variable impedance 23 since the variable impedance 23 is connected to the gear train 34. The variable impedance 23 is varied in a manner to provide a compensating signal of the type shown in FIG. 3 to cancel the error signal induced due to gimbal error when the aircraft banks, as explained with respect of FIG. 1.

Referring to FIG. 5, an alternative embodiment of the present invention is shown in which a transformer 40 has its output winding 41 connected in series with the lead 14. The input winding 42 of the transformer 40 is connected to a function generator 43 which in turn is responsive to the roll signal from the roll transmitter 25 of the vertical gyro 24. The impedance in the lead 14 may be varied by designing the characteristics of the transformer 40 and the function generator 43, to provide the required compensation signal. The function generator 43 may be of the type shown in FIG. 12.19 on page 44 of the Waveforms volume of the MIT Radiation Laboratory Series published by McGraw-Hill in 1949. The embodiment of FIG. 5 provides an additional advantage over that of FIG. 4 since no moving parts are required for its implementation.

It will be appreciated that the present invention provides an extremely simple and accurate method of compensating for the heading error induced by the roll or pitch attitude of the airplane. Further, the present invention is universally adaptable to provide this correction in existing directional gyro compass systems as well as other systems subject to gimbal error.

It will be appreciated that in systems where the two cycle error is relatively small, only a variable inductor may be necessary whereas the insertion of a variable resistance in series with the variable inductance in which both are varied simultaneously may be preferable where greater variation in the impedance is desired. Further, it will be realized that if the system comprised capacitive reactance instead of inductance, a correction device including capacitive reactance would preferably be utilized.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:
1. In a gyroscopic data transmission system
   (1) a gyroscope,
   (2) data transmission means including a transmitter connected to said gyroscope, a receiver and a connecting circuit connected in multi-circuit fashion between said transmitter and receiver, said transmitter providing an output signal representative of the relative position of said gyroscope which signal is normally in error dependent upon the gimbal configuration and the attitude of the gyroscope,
   (3) means for providing an attitude signal representative of the attitude of said gyroscope,
   (4) and variable impedance means connected between said transmitter and said receiver in said connecting circuit of said data transmission means and responsive to said attitude signal for providing a compensating signal which effectively compensates for said error due to the gimbal configuration and attitude of the gyroscope.
2. In a gyroscopic data transmission system
   (1) a gyroscope,
   (2) data transmission means including a transmitter connected to said gyroscope, a receiver and a connecting circuit connected in multi-circuit fashion between said transmitter and receiver, said transmitter providing an output signal representative of the relative position of said gyroscope which signal is normally in error dependent upon the gimbal configuration and the attitude of the gyroscope,
   (3) means for providing an attitude signal representative of the attitude of said gyroscope,
   (4) and variable impedance means connected between said transmitter and said receiver in one portion of said multi-circuit connecting circuit and responsive to said attitude signal for providing a compensating signal which corrects said output signal.

3. In a gyroscopic data transmission system
(1) a first gyroscope,
(2) data transmission means including a transmitter connected to a first gyroscope, a receiver and a connecting circuit connected in multi-circuit fashion between said transmitter and receiver, said transmitter providing an output signal representative of the relative position of a first gyroscope which signal is normally in error dependent upon the gimbal configuration and the attitude of said first gyroscope,
(3) second gyroscopic means including means for providing an attitude signal representative of the attitude of said first gyroscope,
(4) and variable impedance means connected in one portion of said multi-circuit connecting circuit and responsive to said attitude signal for providing a compensating signal which corrects said output signal.

4. In a gyroscopic data transmission system
(1) a directional gyroscope,
(2) data transmission means including a transmitter connected to said directional gyroscope, a receiver and a connecting circuit connected in multi-circuit fashion between said transmitter and receiver, said transmitter providing an output signal representative of the relative position of said directional gyroscope which signal is normally in error dependent upon the gimbal configuration of the attitude of said directional gyroscope,
(3) vertical gyroscope means including means for providing an attitude signal representative of the attitude of said directional gyroscope,
(4) and variable impedance means connected in one portion of said multi-circuit connecting circuit and responsive to said attitude signal fro providing a compensating signal which corrects said output signal.

5 In a gyroscope data transmission system
(1) a directional gyroscope,
(2) data transmission means including a transmitter connected to said directional gyroscope, a receiver and a connecting circuit connected in multi-circuit fashion between said transmitter and receiver, said transmitter providing an output signal representative of the relative position of said gyroscope which signal is normally in error dependent upon the gimbal configuration and the attitude of the directional gyroscope,
(3) vertical gyroscope means including means for providing an attitude signal representative of the roll attitude of said directional gyroscope,
(4) and variable impedance means connected between said transmitter and said receiver in one portion of said multi-circuit connecting circuit and responsive to said attitude signal for providing a compensating signal which corrects said output signal.

6. In a gyroscopic data transmission system
(1) a directional gyroscope,
(2) data transmission means including a transmitter connected to said gyroscope, a receiver and a connecting circuit connected in multi-circuit fashion between said transmitter and receiver, said transmitter providing an output signal representative of the relative position of said gyroscope which signal is normally in error dependent upon the gimbal configuration and the attitude of the gyroscope,
(3) vertical gyroscope means including means for providing an attitude signal representative of the pitch attitude of said directional gyroscope,
(4) and variable impedance means connected in one portion of said multi-circuit connecting circuit and responsive to said attitude signal for providing a compensating signal which corrects said output signal.

7. In a gyroscopic data transmission system
(1) a directional gyroscope,
(2) data transmission means including a transmitter connected to said directional gyroscope, a receiver and a connecting circuit connected in multi-circuit fashion between said transmitter and receiver, said transmitter providing an output signal representative of the relative position of said directional gyroscope which signal is normally in error dependent upon the gimbal configuration and the attitude of said directional gyroscope,
(3) vertical gyroscopic means including means for providing an attitude signal representative of the attitude of said directional gyroscope,
(4) variable impedance means connected in series in one portion of said multi-circuit connecting circuit,
(5) and servo means responsive to said attitude signal for varying said variable impedance means to effectively compensate for said error due to the gimbal configuration and attitude of said directional gyroscope.

8. In a gyroscopic data transmission system
(1) a directional gyroscope,
(2) data transmission means including a transmitter connected to said directional gyroscope, a receiver and a connecting circuit connected in multi-circuit fashion between said transmitter and receiver, said transmitter providing an output signal representative of the relative position of said directional gyroscope which signal is normally in error dependent upon the gimbal configuration of the attitude of said directional gyroscope,
(3) vertical gyroscopic means including means for providing an attitude signal representative of the attitude of said directional gyroscope,
(4) and function generating means connected between said transmitter and said receiver in one portion of said multi-circuit connecting circuit, said function generating means being responsive to said attitude signal for providing a compensating signal which effectively compensates for said error due to the gimbal configuration and attitude of said directional gyroscope.

9. In a gyroscopic data transmission system having a transmitter connected to a gyroscope to provide an output signal representative of the relative position of the gyroscope which signal is normally in error due to the gimbal configuration and attitude of the gyroscope,
(1) means for providing an attitude signal representative of the attitude of said gyroscope, and
(2) variable impedance means connected to said transmitter and responsive to said attitude signal for providing a compensating signal which effectively compensates for said error due to the gimbal configuration and attitude of the gyroscope.

10. Gimbal error correction apparatus comprising
(1) a directional gyroscope,
(2) a synchro transmitter having a stator with a plurality of legs for providing an output signal and a rotor mounted on said directional gyro, said output signal being in error depending upon the attitude of the gimbals of said directional gyro,
(3) means for effectively varying the impedance of one leg of said stator, and
(4) means including a vertical gyro for providing a signal to said impedance varying means for varying the impedance to compensate for said gimbal error.

References Cited by the Examiner
UNITED STATES PATENTS

| 2,597,125 | 5/52 | Noxon | 33—224 |
| 2,667,705 | 2/54 | Glenny | 33—222 |
| 2,700,745 | 1/55 | Repp et al. | 318—24 |
| 2,924,023 | 2/60 | Whitehead | 318—30 |

JOHN F. COUCH, *Primary Examiner*.